United States Patent [19]
Odahara

[11] Patent Number: 4,606,356
[45] Date of Patent: Aug. 19, 1986

[54] COMBINE HARVESTER

[75] Inventor: Tetsuichi Odahara, Sakai, Japan

[73] Assignee: Kubota, Ltd., Osaka, Japan

[21] Appl. No.: 667,395

[22] Filed: Nov. 2, 1984

Related U.S. Application Data

[63] Continuation of Ser. No. 381,881, May 25, 1982, abandoned.

[30] Foreign Application Priority Data

May 25, 1981 [JP] Japan .................................. 56-75907

[51] Int. Cl.[4] .......................... A01F 7/04; A01F 12/18
[52] U.S. Cl. ............................ 130/27 R; 130/27 H; 130/27 T; 130/27 J
[58] Field of Search ............ 56/14.6; 130/27 R, 27 G, 130/27 H, 27 HA, 27 HF, 27 J, 27 K, 27 N, 27 T, 27 Z, DIG. 1

[56] References Cited

U.S. PATENT DOCUMENTS

| | | | |
|---|---|---|---|
| 642,792 | 2/1900 | Hay | 130/27 H |
| 747,456 | 12/1903 | Main et al. | 130/DIG. 1 |
| 756,728 | 4/1904 | Stewart | 130/27 H |
| 1,729,199 | 9/1929 | Wood | 130/DIG. 1 |
| 3,512,533 | 5/1970 | Loewen | 130/27 R |
| 3,543,487 | 12/1970 | Bodine | 56/14.6 |
| 3,946,746 | 3/1976 | Decoene et al. | 130/27 P |
| 4,117,849 | 10/1978 | Pakosh | 56/14.6 |
| 4,307,732 | 12/1981 | De Busscher et al. | 130/27 Z |
| 4,474,188 | 10/1984 | Kashino et al. | 130/27 H |

FOREIGN PATENT DOCUMENTS

| | | | |
|---|---|---|---|
| 3422106 | 12/1984 | Fed. Rep. of Germany | 130/27 H |
| 2057240 | 4/1981 | United Kingdom | 130/27 T |
| 2102664 | 2/1983 | United Kingdom | 130/27 R |

Primary Examiner—Robert P. Swiatek
Assistant Examiner—David L. Tarnoff
Attorney, Agent, or Firm—Cushman, Darby & Cushman

[57] ABSTRACT

A combine harvester according to the invention comprises a reaping section for reaping the crop and bringing the reaped crop substantially to a mid-position transversely of the machine, a conveyer for passing the crop rearwardly and upwardly, a threshing chamber housing a threshing drum for threshing the crop delivered by the conveyer, and straw walkers for separating grain from chaff. The threshing chamber and the straw walkers have large transverse dimensions. The threshing chamber has distributing guide plates on its ceiling to pass grain and straw resulting from the threshing distributedly on to the wide straw walkers.

3 Claims, 9 Drawing Figures

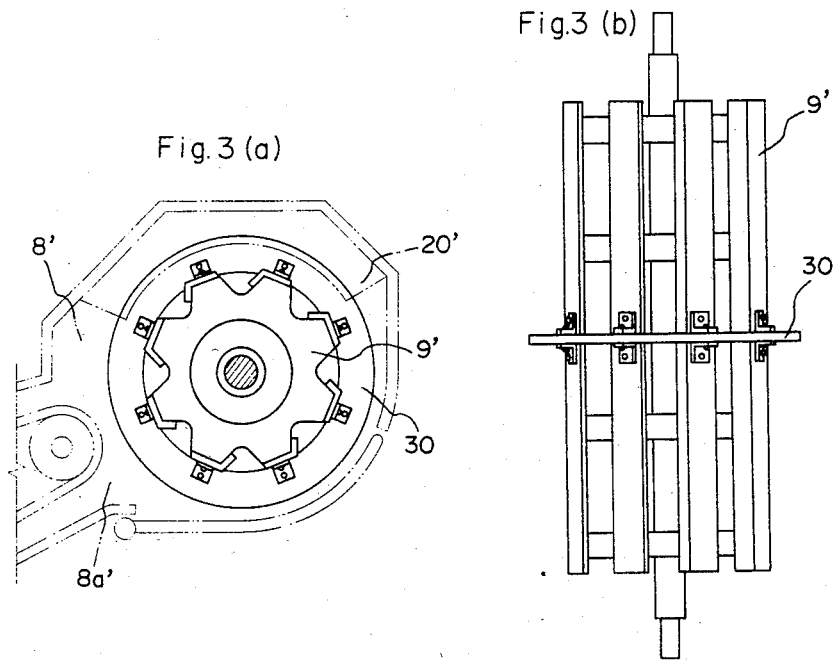
Fig. 3 (a)
Fig. 3 (b)
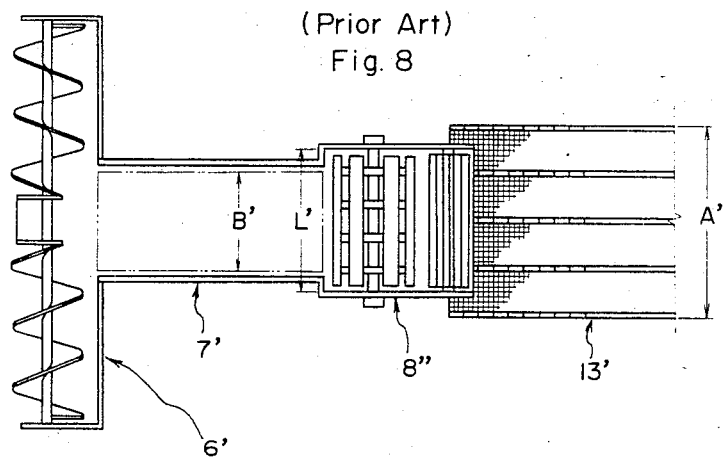
(Prior Art)
Fig. 8

COMBINE HARVESTER

This is a continuation of application Ser. No. 381,881 filed May 25, 1982, now abandoned.

BACKGROUND OF THE INVENTION (1) Field of the Invention

The present invention relates to a combine harvester known as the "straight through" type in which the crop reaped at a reaping section attached to the front of the harvester body is delivered to a threshing chamber for threshing treatment. While the resulting grain is discharged downward from the threshing chamber, straw and part of grain, or tailings, are discharged rearwardly on to oscillatable straw walkers to undergo a separating operation.

(2) Description of the Prior Art

The passage of the crop through a conventional combine harvester is described by reference to FIG. 8 which is a schematic plan view. This type of combine harvester reaps the crop at a reaping section 6' disposed at the front of its body, and collects the reaped crop at a transversely mid-position of the reaping section, from which the crop is delivered by a conveyer 7' to a threshing chamber 8" for threshing treatment. The resulting mixture of straw and grain, or tailings needing further threshing, is passed on to oscillatable straw walkers 13' arranged rearwardly of the threshing chamber 8" to receive a separating treatment. The reaping section 6' includes right and left screw conveyers of opposite threading to collect the reaped crop substantially in a mid-position transversely of the harvester. The purpose of concentrating the reaped crop is to form a bulky heap of the crop to facilitate pickup by the conveyer 7'. The threshing chamber 8" is rather narrow since its transverse dimension L' is determined according to transverse dimension B' of the conveyer 7'. Therefore, the straw walkers 13' too are rather narrow since their transverse dimension A' is determined according to the transverse dimension L' of the threshing chamber 8".

Varied improvements have been made in the prior construction described above in order to achieve higher separating efficiency, and one of them is enlargement of the area of the straw walkers 13'. However, the straw walkers 13' cannot be wide since its transverse dimension A' has to be limited governed by the transverse dimensions L', B' of the threshing chamber 8" and the conveyer 7'. Enlargement of the area of the straw walkers 13' is therefore possible only by elongating them rearwardly, but this has the disadvantage of enlarging the harvester with an increased longitudinal size. Even if the straw walkers 13' are enlarged in the transverse direction, this alone does not lead to improvement in separating efficiency since the threshed product from the narrow threshing chamber 8" does not spread over the whole width of the straw walkers 13'.

Enlarging both the conveyer 7' and the threshing chamber 8" in the transverse direction has the disadvantages of enlarging the conveyer 7' which is necessarily adapted to be vertically oscillatable and of deteriorating the pickup by the conveyer 7' of the crop since the crop has to be less concentrated resulting in a less bulky heap of the crop at the reaping section 6'. It has therefore been desired to improve the selecting efficiency of the straw walkers 13' without increasing the entire length of the combine harvester and while retaining the good pickup by the conveyer 7'.

SUMMARY OF THE INVENTION

Having regard to the disadvantage of the prior art, the object of the present invention is to provide a combine harvester with improved selecting efficiency without enlarging its body.

A combine harvester according to the present invention comprises a reaping section disposed forwardly of a harvester body and adapted to bring reaped crop substantially to a mid-position transversely of the harvester body, a conveyer for conveying the reaped crop rearwardly and upwardly, a threshing chamber including a threshing drum and receiving the crop delivered by the conveyer at an inlet disposed centrally in a front of the threshing chamber, the threshing chamber having a transverse dimension greater than a transverse dimension of the conveyer, distributing guide means disposed on an upper inner wall of the threshing chamber to separate and distribute the crop sideways from a mid-position transversely of the threshing chamber as the crop revolves with the threshing drum in an upward, forward and downward direction, and straw walkers disposed rearwardly of the threshing chamber and having a transverse dimension greater than the transverse dimension of the threshing chamber.

With this invention the crop is transported at a fixed width by the conveyer from the reaping section to the threshing chamber where the crop is threshed and at the same time separated and distributing guide plates provided on the ceiling of the threshing chamber. Then the threshed crop, or straw, is placed on the straw walker at a greater width than when introduced into the threshing chamber. Accordingly it is now possible to provide the straw walkers of greater transverse dimension than in the prior art. The invention makes effective use of the whole width of the straw walkers thereby to achieve improved efficiency of the separating treatment for the mixture of straw and grain, or tailings.

Other objects and advantages of the present invention will be apparent from the following description.

BRIEF DESCRIPTION OF THE DRAWINGS

FIG. 3(a) and FIG. 3(b) are side and plan views of an improved threshing drum, FIG. 8 is a plan view illustrating a principal part of a prior art combine harvester.

DESCRIPTION OF THE PREFERRED EMBODIMENTS

Figure 1:
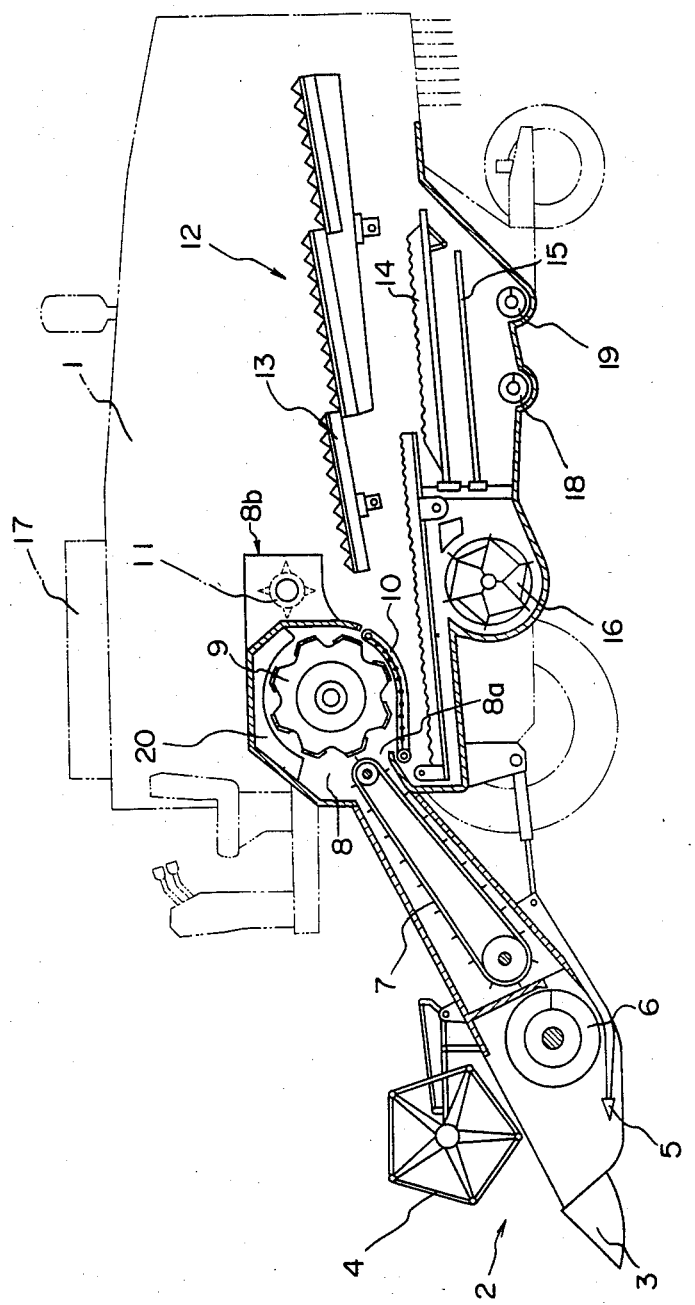
FIG. 1 is a side view, partly in section, of a combine harvester according to the present invention.

Referring to FIG. 1, a combine harvester according to the present invention, which is the type to pass the the straw straight through the machine, comprises a body 1, and a reaping section 2 attached to the front of the body 1. The reaping section 2 includes a crop divider 3, a pickup reel 4, and a cutter blade 5. Number 6 indicates an auger which collects reaped crop to the center, and number 7 indicates a conveyer which picks up the crop and feeds it into a threshing chamber 8 through an inlet 8a provided frontally and centrally of the chamber 8. The threshing chamber 8 includes a threshing drum 9, a concave 10 opposed to the bottom of the threshing drum 9, and discharging beaters 11 disposed at outlets 8b at the rear of the threshing chamber 8. A separating section 12 rearwardly of the threshing chamber 8 includes straw walkers 13 extending from below the outlets 8b of the threshing chamber 8 to a rearward position of the harvester body 1, a chaff sieve 14 and a grain sieve 15 disposed under the straw walkers 13, and a fan 16 for generating winnowing blast. At the bottom of the separating section 12 there are a first screw conveyer 18 for conveying grain which is to be collected in a grain tank 17 and a second screw conveyer 19 for conveying tailings, which need further threshing, back to the threshing chamber 8 or to a secondary threshing chamber (not shown).

The threshing chamber 8 has on the ceiling a plurality of distributing guide plates 20 opposed to the upper periphery of the threshing drum 9. These guide plates 20, as seen from FIG. 2, diverge sideways as they extend forward from adjacent the center of the rear of the threshing chamber 8 so that the crop revolving together with the threshing drum 9 in the upward and forward direction is separated and distributed sideways. The threshing chamber 8 is closed at the rear central position to define a guide surface 8c to help the crop in following the revolution of the threshihg drum 9 during the upward phase. The two outlets 8b (and the beaters 11) are disposed at both lateral sides of the chamber 8 with the guide surface 8c in between.

Figure 2:
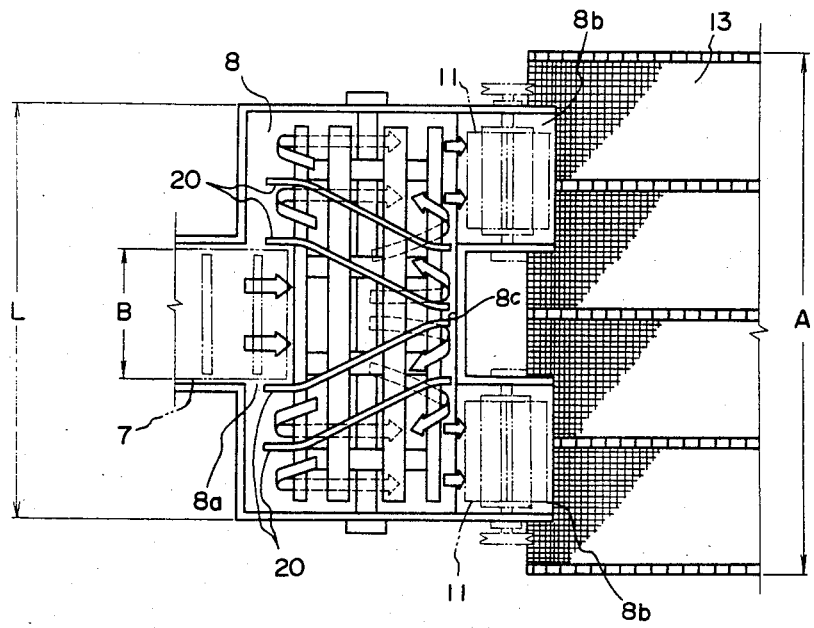
FIG. 2 is an enlarged sectional plan view of a principal part of the combine harvester.

The crop reaped at the reaping section 2 is fed by the conveyor 7 into the threshing chamber 8 through the inlet 8a defined at the center front of the threshing chamber 8, and is placed between the lower surface of the threshing drum 9 and the concave 10. Since the center rear of the threshing chamber 8 opposite the inlet 8a is closed, or defines the guide surface 8c, the crop is raised upward by the revolution of the drum 9 and by the presence of the guide surface 8c, after passing under the drum 9, instead of being discharged from the threshing chamber 8. As the crop advances upward and forward, it is separated to right and left by the guide plates 20 and is passed on to transversely separate positions of the forward part of the threshing chamber 8 and back to the bottom, under the threshing drum 9, remaining transversely separate. The crop, now threshed straw, leaves the chamber 8 from the two right and left outlets 8b helped by the beaters 11, and lands on the straw walker 13. The straw is thus discharged from the threshing chamber 8 in the sideways separated manner. As shown in FIG. 2, the straw walker 13 has a transverse dimension A far greater than transverse dimension B of the conveyer 7 or of the inlet 8a of the threshing chamber 8. The straw is delivered on to the wide straw walker 13 as spread over the entire width. The area of the straw walker is enlarged by widening it and without elongating it, and effective use of the entire area of the straw walker results in an improved grain separating efficiency. According to the described construction, the crop receives the threshing treatment twice between the drum 9 and the concave 10, first at the mid-position and then at either side transversely of the threshing chamber, which results in doubled threshing efficiency.

Figure 4:
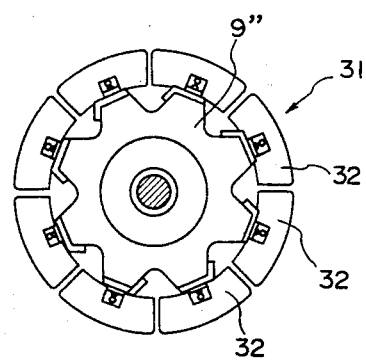
FIG. 4 is a side view showing another example of improved threshing drum.
Figure 5:
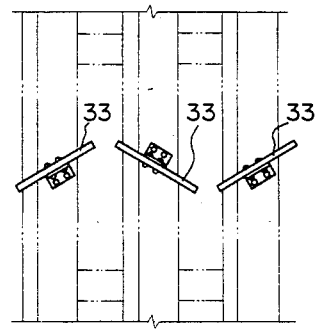
FIGS. 5 through 7 are developed plan views, respectively, showing further examples of improved threshing drum.
Figure 6:
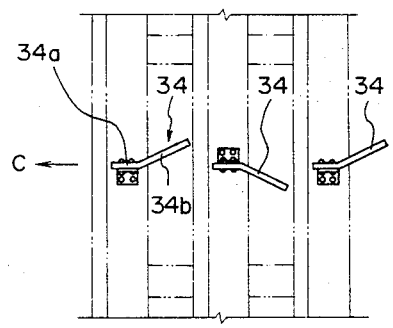
Figure 7:
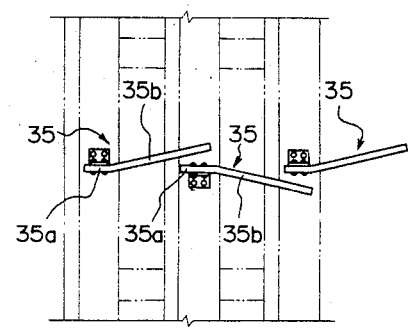

Varied improvements in the threshing drum are now described with reference to FIGS. 3–7. Referring to FIG. 3(a) and FIG. 3(b), a modified drum 9' has an annular partition plate 30 secured to the periphery at the middle axially thereof. The partition plate 30 transversely separates the crop entering the threshing chambers 8 through the inlet 8a, thereby to combine with the guide plates 20 on the ceiling of the threshing chamber 8 for improved crop distributing function. FIG. 4 shows another example of threshing drum 9" which has a partition 31 divided into plural parts 32 attached in series to the periphery of the drum 9" at the middle axially thereof. This arrangement facilitates mounting of the partition on to the drum. In FIG. 5 a plurality of partition elements 33 are inclined alternately in opposite directions, whereby the partition per se functions to distribute the crop. In this instance the distributing function may be improved by providing partition elements 34 as shown in FIG. 6. Each of these elements 34 comprises a forward portion 34a and a rearward portion 34b with respect to the direction of revolution C of the threshing drum, the forward portion 34a being parallel to the direction of revolution C and the rearward portion 34b being inclined therefrom. The arrangement may be modified as shown in FIG. 7 in which each partition element 35 has a partion 35a parallel to the direction of revolution overlapping with an inclined portion 35b of element 35 disposed forwardly thereof. In the foregoing embodiments the threshing drums are the type known as the rasp type, but the described improvements are applicable also to the spike or other types of threshing drum.

It is within the scope of the present invention to provide a threshing drum having a greater axial dimension than that shown in the embodiments, in which case corresponding alterations or additions are made to the guide plates 20 and the guide surface 8c, whereby the crop is revolved helically and plural times round the threshing drum. During the helical movement the grain separating operation may progress simultaneously with the threshing operation to achieve high efficiency grain separation.

I claim:
1. A combine harvester comprising:
a reaping section disposed forwardly of a harvester body and adapted to bring a reaped crop substantially to a mid-position transversely of the harvester body;
a conveyor having a transverse dimension B for conveying the reaped crop rearwardly and upwardly;
threshing chamber means having a transverse dimension L greater than said transverse dimension B of said conveyor, for housing a threshing drum and receiving the crop delivered by said conveyor at an inlet disposed centrally in the front of the threshing chamber, said chamber including distributing guide means disposed on an upper inner wall of said threshing chamber to separate and distribute the crop sideways from a mid-position transversely of said threshing chamber as the crop revolves with said threshing drum in an upward, forward and downward direction, and a guide surface disposed at a transversely intermediate position in a rear part of said threshing chamber to guide the crop revolving in an upward direction, and straw walkers disposed rearwardly of said threshing chamber and having a transverse dimension A greater than the transverse dimension L of said threshing chamber, said threshing chamber further including outlets disposed laterally of said guide surface and opening onto an inlet portion of said straw walkers, respectively;

beater means disposed at said outlets to assist in discharge of the threshed crop therefrom, said beater means transferring said crop from each of said outlets to said inlet portion of said straw walkers to distribute said crop rearwardly and laterally relative to said outlets over said transverse dimension A of said straw walkers;

said threshing drum including partition means mounted about a central periphery of said threshing drum for assisting in sideways separation of said crop; and said partition means including a plurality of constituent elements secured to said threshing drum at said central periphery thereof, said constituent elements being alternately inclined in opposite directions to distribute the crop transversely relative the direction of revolution of said threshing drum, each of said constituent elements having a forward portion substantially parallel to a forward direction of rotational movement of said threshing drum and a rearward portion angularly oriented relative to said forward direction, adjacent elements of said constitutent elements at said central periphery having said rearward portions thereof disposed in alternating angular relationships and said rearward portions of each of said constitutent elements angularly extending rearwardly relative to said forward direction and overlapping the forward portion of an immediately rearwardly adjacent one of said constitutent elements.

2. A combine harvester comprising in combination:

a harvester body;

reaping means forwardly disposed of said harvester body for reaping a crop and for convergingly moving the reaped crop to a central portion thereof;

conveyor means having one end disposed in cooperative association with said central portion for conveying the reaped crop rearwardly and upwardly;

a threshing chamber disposed at the other end of said conveyor means for receiving the reaped crop conveyed thereby, said threshing chamber to permit rotational movement thereof in a forward direction for threshing the reaped crop, and distribution guide means fixed to an upper wall of said threshing chamber for laterally separating the reaped crop received in said threshing chamber in opposing directions toward respective lateral ends of the threshing drum means by virtue of the reaped crop being moved thereagainst by said threshing drum means, said guide means distributing the reaped crop laterally, separated thereby, to a respective pair of openings formed in a rear wall of the threshing chamber near respective ones of said lateral ends of said threshing drum means;

partition means, fixed to and carried with said threshing drum means about a central periphery thereof and cooperating with said distribution guide means to assist in the lateral separation of the reaped crop, said partition means including plural partition members arranged in a row along said central periphery relative to the forward direction of rotational movement of said threshing drum means, each said partition member having a forward portion substantially parallel to the forward direction of rotational movement of said threshing drum means and a rearward portion angularly oriented relative to said forward direction, adjacent members of said partition members along said row having said rearward portions thereof disposed in alternating angular relationships and said rearward portions of each said partition member angularly extending rearwardly relative to said forward direction and overlapping the forward portion of an immediately rearwardly adjacent one of said partition members;

straw walker means having an inlet portion transversely disposed between said pair of openings and having side portions laterally extending beyond each of said pair of openings for receiving the threshold crop thereon and for separating usable and nonusable portions of the crop; and a pair of beater means operatively associated with a respective one of said pair of openings for transferring said crop from each of said openings into said inlet portion of said straw walker means, said beater means distributing said crop rearwardly and laterally relative to said openings to distribute said crop on said inlet portion of said straw walker means between said side portions thereof.

3. A combine harvester comprising:

a reaping section disposed forwardly of a harvester body and adapted to bring a reaped crop substantially to a mid-position transversely of the harvester body;

a conveyor having a transverse dimension B for conveying the reaped crop rearwardly and upwardly;

threshing chamber means having a transverse dimension L greater than said transverse dimension B of said conveyor, for housing a threshing drum and receiving the crop delivered by said conveyor at an inlet disposed centrally in the front of the threshing chamber, said chamber including distributing guide means disposed on an upper inner wall of said threshing chamber to separate and distribute the crop sideways from a mid-position transversely of said threshing chamber as the crop revolves with said threshing drum in an upward, forward and downward direction, and a guide surface disposed at a transversely intermediate position in a rear part of said threshing chamber to guide the crop revolving in an upward direction, and straw walkers disposed rearwardly of said threshing chamber and having a transverse dimsension A greater than the transverse dimension L of said threshing chamber, said threshing chamber further including outlets disposed laterally of said guide surface and opening onto an inlet portion of said straw walkers, respectively;

beater means disposed at said outlets to assist in discharge of the threshed crop therefrom, said beater means transferring said crop from each of said outlets to said inlet portion of said straw walkers to distribute said crop rearwardly and laterally relative to said outlets over said transverse dimension A of said straw walkers;

said threshing drum including partition means mounted about a central periphery of said drum for assisting in sideways separation of said crops; and said partition means including plural partition members arranged in a row along said central periphery of said drum, each said partition member including means establishing (a) a forward portion substantially parallel to a forward direction of rotational movement of said threshing drum means and (b) a rearward portion angularly oriented relative to said forward direction, adjacent menbers of said partition members along said row having said rearward portions disposed in alternating angular relationships, and rearward portions of each partition member angularly extending rearwardly relative to said forward direction so as to overlap the forward portion of an immediately adjacent one of said partition members.

* * * * *